(12) United States Patent
Lenius et al.

(10) Patent No.: US 11,180,037 B2
(45) Date of Patent: Nov. 23, 2021

(54) CONTACTLESS ELECTRICAL COUPLING FOR A ROTATABLE LIDAR DEVICE

(71) Applicant: Waymo LLC, Mountain View, CA (US)

(72) Inventors: Samuel William Lenius, Mountain View, CA (US); Pierre-yves Droz, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 43 days.

(21) Appl. No.: 16/658,499

(22) Filed: Oct. 21, 2019

(65) Prior Publication Data

US 2020/0052531 A1 Feb. 13, 2020

Related U.S. Application Data

(60) Continuation of application No. 15/851,907, filed on Dec. 22, 2017, now Pat. No. 10,491,052, which is a
(Continued)

(51) Int. Cl.
*B60L 53/12* (2019.01)
*H02J 7/02* (2016.01)
(Continued)

(52) U.S. Cl.
CPC ............. *B60L 53/12* (2019.02); *B60L 3/0015* (2013.01); *B60L 7/12* (2013.01); *B60L 8/003* (2013.01);
(Continued)

(58) Field of Classification Search
CPC .......... B60L 53/12; B60L 50/30; B60L 50/16; B60L 50/40; B60L 3/0015; B60L 7/12;
(Continued)

(56) References Cited

U.S. PATENT DOCUMENTS 3,790,277 A 2/1974 Hogan
4,514,645 A 4/1985 Endo et al.
(Continued)

FOREIGN PATENT DOCUMENTS

| CN | 101459351 A | 6/2009 |
|---|---|---|
| EP | 1050437 A2 | 11/2000 |
| KR | 10-2010-0001477 | 2/2010 |

OTHER PUBLICATIONS

International Search Report and Written Opinion, dated Dec. 8, 2014, from International Patent Application No. PCT/US2014/056365.

*Primary Examiner* — Daniel Cavallari
(74) *Attorney, Agent, or Firm* — McDonnell Boehnen Hulbert & Berghoff LLP

(57) ABSTRACT

A rotatable LIDAR device including contactless electrical couplings is disclosed. An example rotatable LIDAR device includes a vehicle electrical coupling including (i) a first conductive ring, (ii) a second conductive ring, and (iii) a first coil. The example rotatable LIDAR device further includes a LIDAR electrical coupling including (i) a third conductive ring, (ii) a fourth conductive ring, and (iii) a second coil. The example rotatable LIDAR device still further includes a rotatable LIDAR electrically coupled to the LIDAR electrical coupling. The first conductive ring and the third conductive ring form a first capacitor configured to transmit communications to the rotatable LIDAR, the second conductive ring and the fourth conductive ring form a second capacitor configured to transmit communications from the rotatable LIDAR, and the first coil and the second coil form a transformer configured to provide power to the rotatable LIDAR.

9 Claims, 9 Drawing Sheets

Related U.S. Application Data division of application No. 15/214,231, filed on Jul. 19, 2016, now Pat. No. 9,882,433, which is a continuation of application No. 14/042,705, filed on Sep. 30, 2013, now Pat. No. 9,425,654.

(51) Int. Cl.

| | | |
|---|---|---|
| *B60L 3/00* | (2019.01) | |
| *B60L 7/12* | (2006.01) | |
| *B60L 8/00* | (2006.01) | |
| *B60L 50/30* | (2019.01) | |
| *B60L 50/16* | (2019.01) | |
| *B60L 50/40* | (2019.01) | |
| *G01S 17/931* | (2020.01) | |
| *H02J 50/10* | (2016.01) | |
| *G01S 7/481* | (2006.01) | |
| *H02J 50/80* | (2016.01) | |
| *G01S 17/42* | (2006.01) | |
| *G01S 7/00* | (2006.01) | |

(52) U.S. Cl.
CPC .............. *B60L 50/16* (2019.02); *B60L 50/30* (2019.02); *B60L 50/40* (2019.02); *G01S 7/4817* (2013.01); *G01S 17/931* (2020.01); *H02J 7/025* (2013.01); *H02J 50/10* (2016.02); *H02J 50/80* (2016.02); *B60L 2240/12* (2013.01); *B60L 2240/16* (2013.01); *B60L 2240/18* (2013.01); *B60L 2240/20* (2013.01); *B60L 2240/421* (2013.01); *B60L 2240/441* (2013.01); *B60L 2240/461* (2013.01); *B60L 2240/622* (2013.01); *G01S 7/003* (2013.01); *G01S 17/42* (2013.01); *Y02T 10/64* (2013.01); *Y02T 10/70* (2013.01); *Y02T 10/7072* (2013.01); *Y02T 10/72* (2013.01); *Y02T 90/16* (2013.01)

(58) Field of Classification Search
CPC .. B60L 8/003; B60L 2240/12; B60L 2240/16; B60L 2240/18; B60L 2240/20; B60L 2240/421; B60L 2240/441; B60L 2240/461; B60L 2240/622; G01S 17/931; G01S 7/4817; G01S 17/42; G01S 7/003; H02J 50/80; H02J 7/025; H02J 50/10; Y02T 10/64; Y02T 10/72; Y02T 10/7072; Y02T 90/16; Y02T 10/70; Y02T 90/14
See application file for complete search history.

(56) References Cited

U.S. PATENT DOCUMENTS

| | | |
|---|---|---|
| 4,700,301 A | 10/1987 | Dyke |
| 4,709,195 A | 11/1987 | Hellekson et al. |
| 5,202,742 A | 4/1993 | Frank et al. |
| 5,691,687 A | 11/1997 | Kumagai et al. |
| 6,950,633 B2 | 9/2005 | Kojima et al. |
| 7,089,114 B1 | 8/2006 | Huang |
| 7,187,823 B2 | 3/2007 | Dimsdale et al. |
| 7,248,342 B1 | 7/2007 | Degnan |
| 7,255,275 B2 | 8/2007 | Gurevich et al. |
| 7,352,929 B2 | 4/2008 | Hagen et al. |
| 7,667,769 B2 * | 2/2010 | Gao .................. H04N 5/225 348/374 |
| 7,969,558 B2 | 6/2011 | Hall |
| 9,052,579 B1 | 6/2015 | Poulad et al. |
| 9,425,654 B2 | 8/2016 | Lenius et al. |
| 9,882,433 B2 | 1/2018 | Lenius et al. |
| 10,491,052 B2 | 11/2019 | Lenius et al. |
| 2005/0279914 A1 * | 12/2005 | Dimsdale ............... G01S 17/89 250/205 |
| 2009/0214051 A1 | 8/2009 | Lockett et al. |
| 2010/0020306 A1 | 1/2010 | Hall |
| 2010/0063736 A1 | 3/2010 | Hoetzer |
| 2010/0207822 A1 | 8/2010 | Sotoudeh |
| 2012/0007442 A1 * | 1/2012 | Rhodes .................. H01F 38/14 307/104 |
| 2015/0006005 A1 * | 1/2015 | Yu ........................ G06Q 50/28 701/22 |

* cited by examiner

US 11,180,037 B2

CONTACTLESS ELECTRICAL COUPLING FOR A ROTATABLE LIDAR DEVICE

CROSS-REFERENCE TO RELATED APPLICATIONS

This application is a continuation of application Ser. No. 15/851,907, filed Dec. 22, 2017, which is a division of application Ser. No. 15/214,231, filed Jul. 19, 2016, now U.S. Pat. No. 9,882,433, which is a continuation of application Ser. No. 14/042,705, filed Sep. 30, 2013, now U.S. Pat. No. 9,425,654. The foregoing applications are incorporated herein by reference.

BACKGROUND

Unless otherwise indicated herein, the materials described in this section are not prior art to the claims in this application and are not admitted to be prior art by inclusion in this section.

Vehicles can be configured to operate in an autonomous mode in which the vehicle navigates through an environment with little or no input from a driver. Such autonomous vehicles can include one or more sensors that are configured to detect information about the environment in which the vehicle operates. The vehicle and its associated computer-implemented controller use the detected information to navigate through the environment. For example, if the sensor(s) detect that the vehicle is approaching an obstacle, as determined by the computer-implemented controller, the controller adjusts the vehicle's directional controls to cause the vehicle to navigate around the obstacle.

One such sensor is a light detection and ranging (LIDAR) device. A LIDAR actively estimates distances to environmental features while scanning through a scene to assemble a cloud of point positions indicative of the three-dimensional shape of the environmental scene. Individual points are measured by generating a laser pulse and detecting a returning pulse, if any, reflected from an environmental object, and determining the distance to the reflective object according to the time delay between the emitted pulse and the reception of the reflected pulse. The laser, or set of lasers, can be rapidly and repeatedly scanned across a scene to provide continuous real-time information on distances to reflective objects in the scene. Combining the measured distances and the orientation of the laser(s) while measuring each distance allows for associating a three-dimensional position with each returning pulse. A three-dimensional map of points of reflective features is generated based on the returning pulses for the entire scanning zone. The three-dimensional point map thereby indicates positions of reflective objects in the scanned scene.

SUMMARY

Disclosed are contactless electrical couplings for a rotatable light detection and ranging (LIDAR) device.

In some cases, it may be desirable for an autonomous vehicle to use light detection and ranging (LIDAR) to sense its surroundings in all directions. Accordingly, it may be desirable for the LIDAR to be a rotatable LIDAR. However, rotation of a LIDAR device may present challenges in providing power to, transmitting communications to, and/or receiving communications from the LIDAR device. Disclosed are contactless electrical couplings configured to provide power to, transmit communications to, and/or receive communications from a rotatable LIDAR. The contactless electrical couplings may include a vehicle electrical coupling configured to be mounted on a vehicle and a LIDAR electrical coupling electrically coupled to the rotatable LIDAR. The contactless electrical couplings may provide power to the rotatable LIDAR via a transformer formed between coils at the vehicle electrical coupling and the LIDAR electrical coupling. Further, the contactless electrical couplings may transmit communications to and/or receive communications from the rotatable LIDAR via capacitors formed between conductive rings at the vehicle electrical coupling and the LIDAR electrical coupling.

Some embodiments of the present disclosure provide a rotatable LIDAR device. The rotatable LIDAR device may include a vehicle electrical coupling configured to be mounted on a vehicle, a LIDAR electrical coupling, and a rotatable LIDAR electrically coupled to the LIDAR electrical coupling. The vehicle electrical coupling may include (i) a first conductive ring, (ii) a second conductive ring, and (iii) a first coil. Similarly, the rotatable LIDAR electrical coupling may include (i) a third conductive ring, (ii) a fourth conductive ring, and (iii) a second coil. The first conductive ring and the third conductive ring may form a first capacitor configured to transmit communications to the rotatable LIDAR. Similarly, the second conductive ring and the fourth conductive ring may form a second capacitor configured to transmit communications from the rotatable LIDAR. The first coil and the second coil may form a transformer configured to provide power to the rotatable LIDAR.

Some embodiments of the present disclosure provide an autonomous vehicle. The vehicle may include a vehicle electrical coupling configured to be mounted on a vehicle, a LIDAR electrical coupling, and a rotatable LIDAR electrically coupled to the LIDAR electrical coupling. The vehicle electrical coupling may include (i) a first conductive ring, (ii) a second conductive ring, and (iii) a first coil. Similarly, the rotatable LIDAR electrical coupling may include (i) a third conductive ring, (ii) a fourth conductive ring, and (iii) a second coil. The first conductive ring and the third conductive ring may form a first capacitor configured to transmit communications to the rotatable LIDAR. Similarly, the second conductive ring and the fourth conductive ring may form a second capacitor configured to transmit communications from the rotatable LIDAR. The first coil and the second coil may form a transformer configured to provide power to the rotatable LIDAR.

Some embodiments of the present disclosure provide another autonomous vehicle. The vehicle may include a vehicle Ethernet transmitter, a vehicle Ethernet receiver, and a vehicle electrical coupling mounted on the vehicle and electrically coupled to each of the vehicle Ethernet transmitter and the vehicle Ethernet receiver. The vehicle electrical coupling may include (i) a first conductive ring, (ii) a second conductive ring and (iii) a first coil. The vehicle may further include a rotatable LIDAR comprising a LIDAR Ethernet transmitter and a LIDAR Ethernet receiver. The vehicle may still further include a LIDAR electrical coupling electrically coupled to the rotatable LIDAR. The LIDAR electrical coupling may include (i) a third conductive ring, (ii) a fourth conductive ring, and (iii) a second coil. The first conductive ring and the third conductive ring may form a first capacitor configured to transmit communications from the vehicle Ethernet transmitter to the LIDAR Ethernet receiver. Similarly, the second conductive ring and the fourth conductive ring form a second capacitor configured to transmit communications from the LIDAR Ethernet transmitter to the vehicle Ethernet receiver. The first coil and the second coil may form a transformer configured to provide power to the rotatable LIDAR.

These as well as other aspects, advantages, and alternatives, will become apparent to those of ordinary skill in the art by reading the following detailed description, with reference where appropriate to the accompanying drawings.

DETAILED DESCRIPTION

Figure 1:
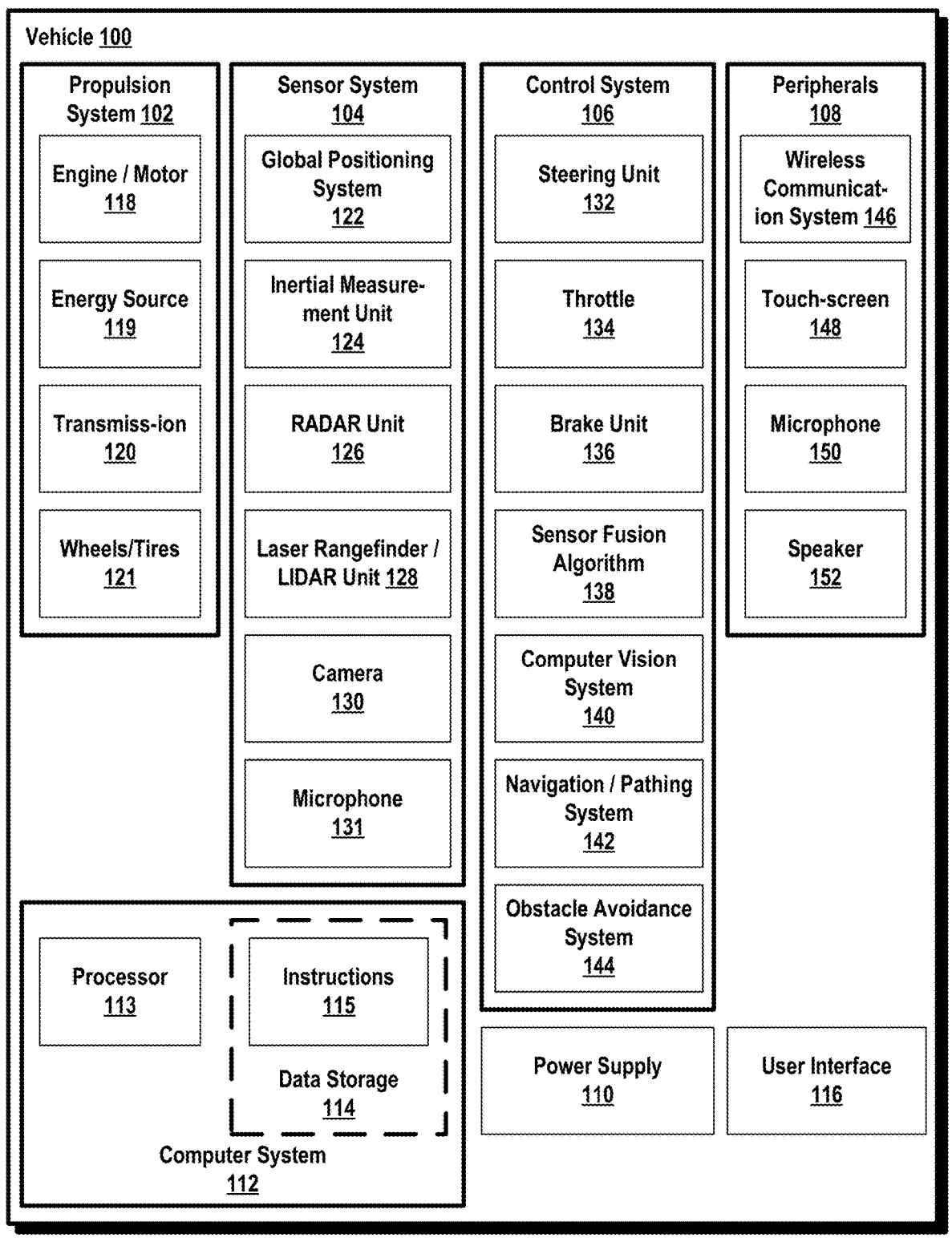
FIG. 1 is a functional block diagram depicting aspects of an example autonomous vehicle.

In some cases, it may be desirable for an autonomous vehicle to use light detection and ranging (LIDAR) to sense its surroundings in all directions. Accordingly, it may be desirable for the LIDAR to be a rotatable LIDAR. The rotatable LIDAR may, for example, be mounted on the autonomous vehicle and configured to rotate (e.g., 360°) about a vertical axis.

The rotation of a LIDAR device may present challenges in providing power to, transmitting communications to, and/or receiving communications from the LIDAR device. In particular, it may be undesirable to use cables to provide power to, transmit communications to, and/or receive communications from the rotatable LIDAR, because the cables may suffer damage (e.g., due to friction) during the rotation of the rotatable LIDAR.

One possibility for providing power to, transmitting communications to, and receiving communications from a rotatable LIDAR is a slip ring, which forms an electrical coupling with the rotatable LIDAR using metal (e.g., precious metal) sliding contacts or a liquid metal (e.g., mercury). However, slip rings can be expensive, wear out, and/or require the use of toxic materials for the liquid metal.

Disclosed herein are embodiments that take the form of or otherwise relate to LIDAR systems with contactless electrical couplings. The contactless electrical couplings may be configured to provide power to, transmit communications to, and/or receive communications from a rotatable LIDAR. The contactless electrical couplings may include a vehicle electrical coupling configured to be mounted on a vehicle and a LIDAR electrical coupling electrically coupled to the rotatable LIDAR.

In an example embodiment, the vehicle electrical coupling may include: (i) a first conductive ring, (ii) a second conductive ring, and (iii) a first coil. Similarly, the LIDAR electrical coupling may include (i) a third conductive ring, (ii) a fourth conductive ring, and (iii) a second coil. In order to provide power to the rotatable LIDAR, the first coil and the second coil may be positioned so as to form a transformer. In order to transmit communications to the rotatable LIDAR, the first conductive ring and the third conductive ring may be positioned so as to form a first capacitor. Similarly, in order to receive communications from the rotatable LIDAR, the second conductive ring and the fourth conductive ring may be positioned so as to form a second capacitor.

In some embodiments, the vehicle electrical coupling, the LIDAR electrical coupling, and the rotatable LIDAR may together form a rotatable LIDAR device. Further, the rotatable LIDAR device may be mounted (or mountable) on an autonomous vehicle. An example autonomous vehicle is described below in connection with FIGS. 1-2, while an example rotatable LIDAR device is described below in connection with FIGS. 3-7B.

In example embodiments, an example autonomous vehicle system may include one or more processors, one or more forms of memory, one or more input devices/interfaces, one or more output devices/interfaces, and machine-readable instructions that when executed by the one or more processors cause the system to carry out the various functions, tasks, capabilities, etc., described above.

Example systems within the scope of the present disclosure will be described in greater detail below. An example system may be implemented in, or may take the form of, an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100 according to an example embodiment. The vehicle 100 is configured to operate fully or partially in an autonomous mode, and thus may be referred to as an "autonomous vehicle." For example, a computer system 112 can control the vehicle 100 while in an autonomous mode via control instructions to a control system 106 for the vehicle 100. The computer system 112 can receive information from one or more sensor systems 104, and base one or more control processes (such as setting a heading so as to avoid a detected obstacle) upon the received information in an automated fashion.

The autonomous vehicle 100 can be fully autonomous or partially autonomous. In a partially autonomous vehicle some functions can optionally be manually controlled (e.g., by a driver) some or all of the time. Further, a partially autonomous vehicle can be configured to switch between a fully-manual operation mode and a partially-autonomous and/or a fully-autonomous operation mode.

The vehicle 100 includes a propulsion system 102, a sensor system 104, a control system 106, one or more peripherals 108, a power supply 110, a computer system 112, and a user interface 116. The vehicle 100 may include more or fewer subsystems and each subsystem can optionally include multiple components. Further, each of the subsystems and components of vehicle 100 can be interconnected and/or in communication. Thus, one or more of the functions of the vehicle 100 described herein can optionally be divided between additional functional or physical components, or combined into fewer functional or physical components. In some further examples, additional functional and/or physical components may be added to the examples illustrated by FIG. 1.

The propulsion system 102 can include components operable to provide powered motion to the vehicle 100. In some embodiments the propulsion system 102 includes an engine/motor 118, an energy source 119, a transmission 120, and wheels/tires 121. The engine/motor 118 converts energy source 119 to mechanical energy. In some embodiments, the propulsion system 102 can optionally include one or both of engines and/or motors. For example, a gas-electric hybrid vehicle can include both a gasoline/diesel engine and an electric motor.

The energy source 119 represents a source of energy, such as electrical and/or chemical energy, that may, in full or in part, power the engine/motor 118. That is, the engine/motor 118 can be configured to convert the energy source 119 to mechanical energy to operate the transmission. In some embodiments, the energy source 119 can include gasoline, diesel, other petroleum-based fuels, propane, other compressed gas-based fuels, ethanol, solar panels, batteries, capacitors, flywheels, regenerative braking systems, and/or other sources of electrical power, etc. The energy source 119 can also provide energy for other systems of the vehicle 100.

The transmission 120 includes appropriate gears and/or mechanical elements suitable to convey the mechanical power from the engine/motor 118 to the wheels/tires 121. In some embodiments, the transmission 120 includes a gearbox, a clutch, a differential, a drive shaft, and/or axle(s), etc.

The wheels/tires 121 are arranged to stably support the vehicle 100 while providing frictional traction with a surface, such as a road, upon which the vehicle 100 moves. Accordingly, the wheels/tires 121 are configured and arranged according to the nature of the vehicle 100. For example, the wheels/tires can be arranged as a unicycle, bicycle, motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 can optionally include at least one wheel that is rigidly attached to the transmission 120 and at least one tire coupled to a rim of a corresponding wheel that makes contact with a driving surface. The wheels/tires 121 may include any combination of metal and rubber, and/or other materials or combination of materials.

The sensor system 104 generally includes one or more sensors configured to detect information about the environment surrounding the vehicle 100. For example, the sensor system 104 can include a Global Positioning System (GPS) 122, an inertial measurement unit (IMU) 124, a RADAR unit 126, a laser rangefinder/LIDAR unit 128, a camera 130, and/or a microphone 131. The sensor system 104 could also include sensors configured to monitor internal systems of the vehicle 100 (e.g., $O_2$ monitor, fuel gauge, engine oil temperature, wheel speed sensors, etc.). One or more of the sensors included in sensor system 104 could be configured to be actuated separately and/or collectively in order to modify a position and/or an orientation of the one or more sensors.

The GPS 122 is a sensor configured to estimate a geographic location of the vehicle 100. To this end, GPS 122 can include a transceiver operable to provide information regarding the position of the vehicle 100 with respect to the Earth.

The IMU 124 can include any combination of sensors (e.g., accelerometers and gyroscopes) configured to sense position and orientation changes of the vehicle 100 based on inertial acceleration.

The RADAR unit 126 can represent a system that utilizes radio signals to sense objects within the local environment of the vehicle 100. In some embodiments, in addition to sensing the objects, the RADAR unit 126 and/or the computer system 112 can additionally be configured to sense the speed and/or heading of the objects.

Similarly, the laser rangefinder or LIDAR unit 128 can be any sensor configured to sense objects in the environment in which the vehicle 100 is located using lasers. The laser rangefinder/LIDAR unit 128 can include one or more laser sources, a laser scanner, and one or more detectors, among other system components. The laser rangefinder/LIDAR unit 128 can be configured to operate in a coherent (e.g., using heterodyne detection) or an incoherent detection mode.

The camera 130 can include one or more devices configured to capture a plurality of images of the environment surrounding the vehicle 100. The camera 130 can be a still camera or a video camera. In some embodiments, the camera 130 can be mechanically movable such as by rotating and/or tilting a platform to which the camera is mounted. As such, a control process of vehicle 100 may be implemented to control the movement of camera 130.

The sensor system 104 can also include a microphone 131. The microphone 131 can be configured to capture sound from the environment surrounding vehicle 100. In some cases, multiple microphones can be arranged as a microphone array, or possibly as multiple microphone arrays.

The control system 106 is configured to control operation(s) regulating acceleration of the vehicle 100 and its components. To effect acceleration, the control system 106 includes a steering unit 132, throttle 134, brake unit 136, a sensor fusion algorithm 138, a computer vision system 140, a navigation/pathing system 142, and/or an obstacle avoidance system 144, etc.

The steering unit 132 is operable to adjust the heading of vehicle 100. For example, the steering unit can adjust the axis (or axes) of one or more of the wheels/tires 121 so as to effect turning of the vehicle. The throttle 134 is configured to control, for instance, the operating speed of the engine/motor 118 and, in turn, adjust forward acceleration of the vehicle 100 via the transmission 120 and wheels/tires 121. The brake unit 136 decelerates the vehicle 100. The brake unit 136 can use friction to slow the wheels/tires 121. In some embodiments, the brake unit 136 inductively decelerates the wheels/tires 121 by a regenerative braking process to convert kinetic energy of the wheels/tires 121 to electric current.

The sensor fusion algorithm 138 is an algorithm (or a computer program product storing an algorithm) configured to accept data from the sensor system 104 as an input. The data may include, for example, data representing information sensed at the sensors of the sensor system 104. The sensor fusion algorithm 138 can include, for example, a Kalman filter, Bayesian network, etc. The sensor fusion algorithm 138 provides assessments regarding the environment surrounding the vehicle based on the data from sensor system 104. In some embodiments, the assessments can include evaluations of individual objects and/or features in the environment surrounding vehicle 100, evaluations of particular situations, and/or evaluations of possible interference between the vehicle 100 and features in the environment (e.g., such as predicting collisions and/or impacts) based on the particular situations.

The computer vision system 140 can process and analyze images captured by camera 130 to identify objects and/or features in the environment surrounding vehicle 100. The detected features/objects can include traffic signals, road way boundaries, other vehicles, pedestrians, and/or obstacles, etc. The computer vision system 140 can optionally employ an object recognition algorithm, a Structure From Motion (SFM) algorithm, video tracking, and/or available computer vision techniques to effect categorization and/or identification of detected features/objects. In some embodiments, the computer vision system 140 can be additionally configured to map the environment, track perceived objects, estimate the speed of objects, etc.

The navigation and pathing system 142 is configured to determine a driving path for the vehicle 100. For example, the navigation and pathing system 142 can determine a series of speeds and directional headings to effect movement of the vehicle along a path that substantially avoids perceived obstacles while generally advancing the vehicle along a roadway-based path leading to an ultimate destination, which can be set according to user inputs via the user interface 116, for example. The navigation and pathing system 142 can additionally be configured to update the driving path dynamically while the vehicle 100 is in operation on the basis of perceived obstacles, traffic patterns, weather/road conditions, etc. In some embodiments, the navigation and pathing system 142 can be configured to incorporate data from the sensor fusion algorithm 138, the GPS 122, and one or more predetermined maps so as to determine the driving path for vehicle 100.

The obstacle avoidance system 144 can represent a control system configured to identify, evaluate, and avoid or otherwise negotiate potential obstacles in the environment surrounding the vehicle 100. For example, the obstacle avoidance system 144 can effect changes in the navigation of the vehicle by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 can be configured such that a swerving maneuver is not undertaken when other sensor systems detect vehicles, construction barriers, other obstacles, etc. in the region adjacent the vehicle that would be swerved into. In some embodiments, the obstacle avoidance system 144 can automatically select the maneuver that is both available and maximizes safety of occupants of the vehicle. For example, the obstacle avoidance system 144 can select an avoidance maneuver predicted to cause the least amount of acceleration in a passenger cabin of the vehicle 100.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. can include a wireless communication system 146, a touchscreen 148, a microphone 150, and/or a speaker 152.

In some embodiments, the peripherals 108 function to receive inputs for a user of the vehicle 100 to interact with the user interface 116. To this end, the touchscreen 148 can both provide information to a user of vehicle 100, and convey information from the user indicated via the touchscreen 148 to the user interface 116. The touchscreen 148 can be configured to sense both touch positions and touch gestures from a user's finger (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 150 can be configured to receive audio (e.g., a voice command or other audio input) from a user of the vehicle 100. Similarly, the speakers 152 can be configured to output audio to the user of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle that provide useful information regarding the vehicle's surroundings, such as traffic information, weather information, etc. For example, the wireless communication system 146 can wirelessly communicate with one or more devices directly or via a communication network. The wireless communication system 146 can optionally use 3G cellular communication, such as CDMA, EVDO, GSM/GPRS, and/or 4G cellular communication, such as WiMAX or LTE. Additionally or alternatively, wireless communication system 146 can communicate with a wireless local area network (WLAN), for example, using WiFi. In some embodiments, wireless communication system 146 could communicate directly with a device, for example, using an infrared link, Bluetooth, and/or ZigBee. The wireless communication system 146 can include one or more dedicated short range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

As noted above, the power supply 110 can provide power to components of vehicle 100, such as electronics in the peripherals 108, computer system 112, sensor system 104, etc. The power supply 110 can include a rechargeable lithium-ion or lead-acid battery for storing and discharging electrical energy to the various powered components, for example. In some embodiments, one or more banks of batteries can be configured to provide electrical power. In some embodiments, the power supply 110 and energy source 119 can be implemented together, as in some all-electric cars.

Many or all of the functions of vehicle 100 can be controlled via computer system 112 that receives inputs from the sensor system 104, peripherals 108, etc., and communicates appropriate control signals to the propulsion system 102, control system 106, peripherals, etc. to effect automatic operation of the vehicle 100 based on its surroundings. Computer system 112 includes at least one processor 113 (which can include at least one microprocessor) that executes instructions 115 stored in a non-transitory computer readable medium, such as the data storage 114. The computer system 112 may also represent a plurality of computing devices that serve to control individual components or subsystems of the vehicle 100 in a distributed fashion.

In some embodiments, data storage 114 contains instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 during operation of the vehicle 100 in the autonomous, semi-autonomous, and/or manual modes to select available roadways to an ultimate destination, interpret information from the sensor system 104, etc.

The vehicle 100, and associated computer system 112, provides information to and/or receives input from, a user of vehicle 100, such as an occupant in a passenger cabin of the vehicle 100. The user interface 116 can accordingly include one or more input/output devices within the set of peripherals 108, such as the wireless communication system 146, the touchscreen 148, the microphone 150, and/or the speaker 152 to allow communication between the computer system 112 and a vehicle occupant.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 can utilize input from the control system 106 to control the steering unit 132 to avoid an obstacle detected by the sensor system 104 and the obstacle avoidance system 144. The computer system 112 can be configured to control many aspects of the vehicle 100 and its subsystems. Generally, however, provisions are made for manually overriding automated controller-driven operation, such as in the event of an emergency, or merely in response to a user-activated override, etc.

The components of vehicle 100 described herein can be configured to work in an interconnected fashion with other components within or outside their respective systems. For example, the camera 130 can capture a plurality of images that represent information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in data storage 114, and/or by other techniques.

Although the vehicle 100 is described and shown in FIG. 1 as having various components of vehicle 100, e.g., wireless communication system 146, computer system 112, data storage 114, and user interface 116, integrated into the vehicle 100, one or more of these components can optionally be mounted or associated separately from the vehicle 100. For example, data storage 114 can exist, in part or in full, separate from the vehicle 100, such as in a cloud-based server, for example. Thus, one or more of the functional elements of the vehicle 100 can be implemented in the form of device elements located separately or together. The functional device elements that make up vehicle 100 can generally be communicatively coupled together in a wired and/or wireless fashion.

Figure 2:
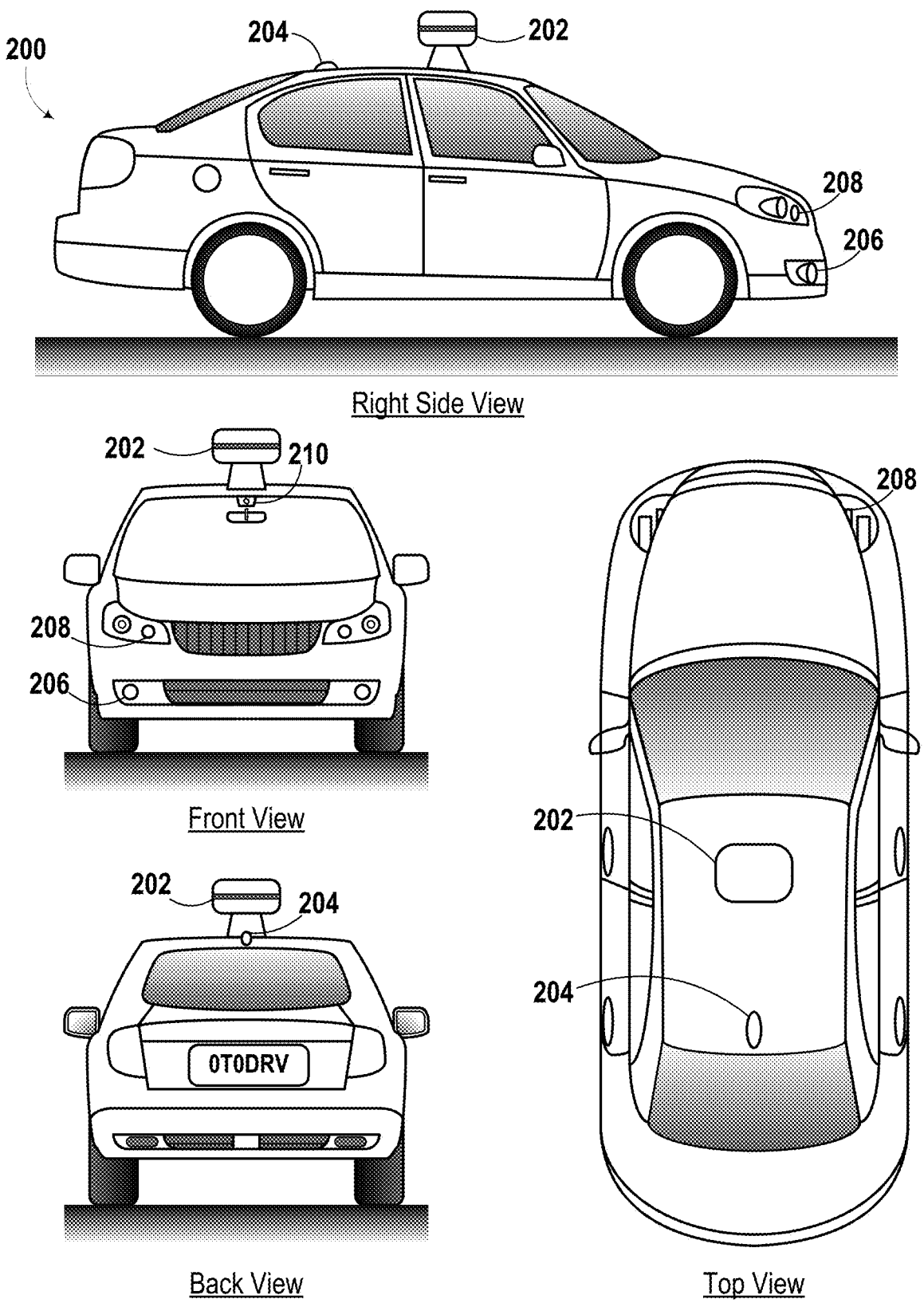
FIG. 2 depicts exterior views of an example autonomous vehicle.

FIG. 2 shows an example vehicle 200 that can include some or all of the functions described in connection with vehicle 100 in reference to FIG. 1. Although vehicle 200 is illustrated in FIG. 2 as a four-wheel sedan-type car for illustrative purposes, the present disclosure is not so limited. For instance, the vehicle 200 can represent a truck, a van, a semi-trailer truck, a motorcycle, a golf cart, an off-road vehicle, or a farm vehicle, etc.

The example vehicle 200 includes a sensor unit 202, a wireless communication system 204, a RADAR unit 206, a laser rangefinder unit 208, and a camera 210. Furthermore, the example vehicle 200 can include any of the components described in connection with vehicle 100 of FIG. 1. The RADAR unit 206 and/or laser rangefinder unit 208 can actively scan the surrounding environment for the presence of potential obstacles and can be similar to the RADAR unit 126 and/or laser rangefinder/LIDAR unit 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, RADARs, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include RADAR unit 206 and laser rangefinder unit 208. Furthermore, each sensor of sensor unit 202 can be configured to be moved or scanned independently of other sensors of sensor unit 202.

In an example configuration, one or more RADAR scanners (e.g., the RADAR unit 206) can be located near the front of the vehicle 200, to actively scan the region in front of the car 200 for the presence of radio-reflective objects. A RADAR scanner can be situated, for example, in a location suitable to illuminate a region including a forward-moving path of the vehicle 200 without occlusion by other features of the vehicle 200. For example, a RADAR scanner can be situated to be embedded and/or mounted in or near the front bumper, front headlights, cowl, and/or hood, etc. Furthermore, one or more additional RADAR scanning devices can be located to actively scan the side and/or rear of the vehicle 200 for the presence of radio-reflective objects, such as by including such devices in or near the rear bumper, side panels, rocker panels, and/or undercarriage, etc.

The wireless communication system 204 could be located on a roof of the vehicle 200 as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 can be a photo-sensitive instrument, such as a still camera, a video camera, etc., that is configured to capture a plurality of images of the environment of the vehicle 200. To this end, the camera 210 can be configured to detect visible light, and can additionally or alternatively be configured to detect light from other portions of the spectrum, such as infrared or ultraviolet light. The camera 210 can be a two-dimensional detector, and can optionally have a three-dimensional spatial range of sensitivity. In some embodiments, the camera 210 can include, for example, a range detector configured to generate a two-dimensional image indicating distance from the camera 210 to a number of points in the environment. To this end, the camera 210 may use one or more range detecting techniques.

For example, the camera 210 can provide range information by using a structured light technique in which the vehicle 200 illuminates an object in the environment with a predetermined light pattern, such as a grid or checkerboard pattern and uses the camera 210 to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements.

The camera 210 can be mounted inside a front windshield of the vehicle 200. Specifically, the camera 210 can be situated to capture images from a forward-looking view with respect to the orientation of the vehicle 200. Other mounting locations and viewing angles of camera 210 can also be used, either inside or outside the vehicle 200.

The camera 210 can have associated optics operable to provide an adjustable field of view. Further, the camera 210 can be mounted to vehicle 200 with a movable mount to vary a pointing angle of the camera 210, such as via a pan/tilt mechanism.

In some cases, the sensor unit 202 described above in connection with FIG. 2 may include a LIDAR device. The LIDAR device may be mountable on a vehicle, such as an autonomous vehicle. Other applications of the LIDAR device are possible as well.

The LIDAR device may include a rotatable LIDAR that is configured to rotate (e.g., 360°) about a vertical axis. Further, the rotatable LIDAR device may include contactless electrical couplings configured to provide power to, transmit communications to, and receive communications from the rotatable LIDAR.

Figure 3:
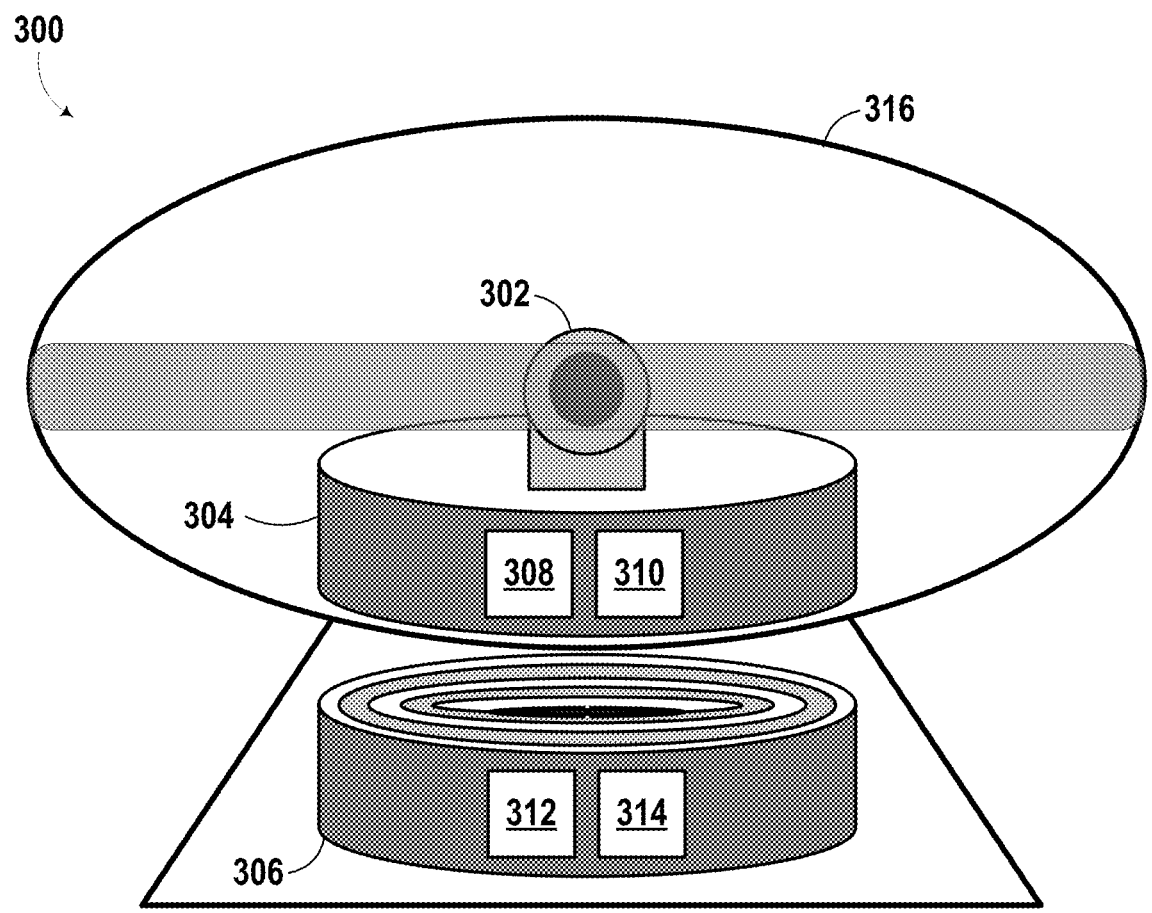
FIG. 3 illustrates an example rotatable LIDAR device.

FIG. 3 illustrates an example rotatable LIDAR device 300. As shown, the rotatable LIDAR device 300 includes a rotatable LIDAR 302, a LIDAR electrical coupling 304, and a vehicle electrical coupling 306.

The rotatable LIDAR 302 may take any of the forms described above for the LIDAR unit 128 in connection with FIG. 1. The rotatable LIDAR 302 may be configured to rotate about a vertical axis. To this end, the rotatable LIDAR 302 may be designed to pivot around a shaft and/or may be mounted on a platform that is designed to rotate. In some embodiments, the rotatable LIDAR device 300 may additionally include a motor configured to rotate the rotatable LIDAR 302. The rotatable LIDAR 302 may be configured to rotate in other manners as well.

The LIDAR electrical coupling 304 may be electrically coupled to the rotatable LIDAR 302. As shown, the LIDAR electrical coupling 304 may include a LIDAR transmitter (e.g., an Ethernet transmitter) 308 configured to transmit communications from the rotatable LIDAR 302. Additionally, as shown, the LIDAR electrical coupling 304 may include a LIDAR receiver (e.g., an Ethernet receiver) 310 configured to receive communications for the rotatable LIDAR 302 (e.g., from the vehicle). An example LIDAR electrical coupling is further described below in connection with FIG. 5.

The vehicle electrical coupling 306 may be mounted on the vehicle (e.g., by means of a base, as shown, or directly) and may be electrically coupled to a power supply at the vehicle (not shown). As shown, the vehicle electrical coupling 306 may include a vehicle transmitter (e.g., an Ethernet transmitter) 312 configured to transmit communications from the vehicle. Additionally, as shown, the vehicle electrical coupling 306 may include a vehicle receiver (e.g., an Ethernet receiver) 314 configured to receive communications for the vehicle (e.g., from the rotatable LIDAR 302). An example vehicle electrical coupling is further described below in connection with FIG. 4.

As shown, the LIDAR electrical coupling 304 may be positioned adjacent to but not in contact with the vehicle electrical coupling 306. When so positioned, the LIDAR electrical coupling 304 and the vehicle electrical coupling 306 may form a transformer, as described below in connection with FIGS. 6A-B. Further, when so positioned, the LIDAR electrical coupling 304 and the vehicle electrical coupling 306 may form one or more capacitors, as described below in connection with FIGS. 7A-B.

Through the transformer, the vehicle electrical coupling 306 may provide power (e.g., from the power supply at the vehicle) to the rotatable LIDAR 302 via the LIDAR electrical coupling 304. Through the capacitor(s), the vehicle electrical coupling 306 may transmit communications (e.g., from one or more components at the vehicle) to and/or receive communications from the rotatable LIDAR 302 via the LIDAR electrical coupling 304. In this manner, the disclosed LIDAR electrical coupling 304 and vehicle electrical coupling 306 may, through contactless electrical coupling, provide power to, transmit communications to, and/or receive communications from the rotatable LIDAR 302.

As shown, the rotatable LIDAR device 300 is housed in a sensor unit 316, which may, for example, be similar to the sensor unit 202 described above in connection with FIG. 2. While the sensor unit 316 is shown to have a particular shape, size, and arrangement, other shapes, sizes, and arrangements are possible as well. Similarly, while the rotatable LIDAR device 302, the LIDAR electrical coupling 304, the vehicle electrical coupling 306, the LIDAR transmitter 308, the LIDAR receiver 310, the vehicle transmitter 312, and the vehicle receiver 314 are shown to have particular shapes, sizes, and arrangements, other shapes, sizes and arrangements are possible as well.

Figure 4:
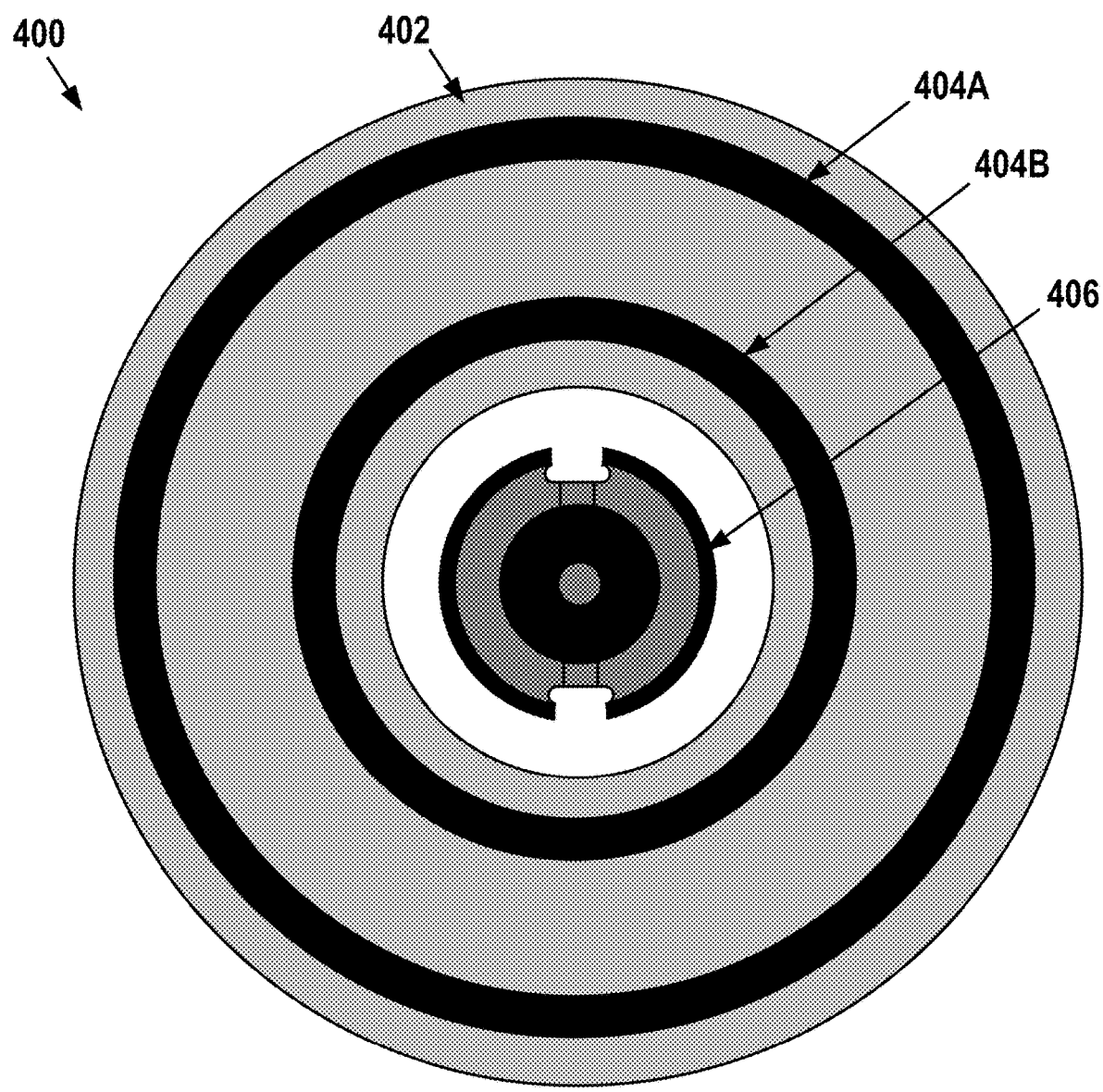
FIG. 4 illustrates an example vehicle electrical coupling.

FIG. 4 illustrates an example vehicle electrical coupling 400. As shown, the vehicle electrical coupling 400 includes a board 402 on which a first conductive ring 404A, a second conductive ring 404B, and a first coil 406 are formed. As shown, the first conductive ring 404A, the second conductive ring 404B, and the first coil 406 are arranged concentrically. In other embodiments, the first conductive ring 404A, the second conductive ring 404B, and the first coil 406 may be arranged concentrically in another order (e.g., the first conductive ring 404A and the second conductive ring 404B may be switched) or in another arrangement. For example, in some embodiments the first and second conductive rings 404A-B may be disposed in a different plane than the first coil 406. As another example, in some embodiments the first and second conductive rings 404A-B could be disposed on coaxial cylinders, such that a cylindrical (rather than planar) gap is formed. Such embodiments may allow for better gap control. Other examples are possible as well. Further, while only two conductive rings are shown, more or fewer conductive rings are possible as well.

The board 402 may be, for example, a printed circuit board. The board 402 may be formed of a non-conductive laminate material, such as woven glass and epoxy (e.g., FR-4, FR-5) or polytetrafluoroethylene (Teflon®). The board 402 may be formed of other materials as well. While the board 402 is shown to be circular, in other embodiments the board 402 may take other shapes. Further, the board 402 may take any number of dimensions, including diameter (or length and width) and thickness. In some embodiments, the board 402 may be designed to have a low relative permittivity so as to insulate the conductive rings 404A, 404B from one another, thereby reducing parasitic capacitance between the conductive rings 404A, 404B.

Each of the first conductive ring 404A and the second conductive ring 404B may be formed of a conductive material, such as copper. Other conductive materials are possible as well. The first conductive ring 404A may be formed of the same conductive material as or a different conductive material than the second conductive ring 404B. While the first conductive ring 404A and the second conductive ring 404B may have different diameters (or lengths and widths), a surface area of the first conductive ring 404A and a surface area of the second conductive ring 404B may be substantially equal. For instance, in the embodiment shown, a width of the first conductive ring 404A may be narrower than a width of the second conductive ring 404B to compensate for the larger diameter of the first conductive ring 404A as compared to the second conductive ring 404B. By having substantially equal surface areas, the first conductive ring 404A and the second conductive ring 404B may form capacitors with the LIDAR electrical coupling (as described below) having substantially equal capacitance. A distance between the first conductive ring 404A and the second conductive ring 404B may vary among embodiments, but in some embodiments the distance may be between, for example, 100 μm and 250 μm. Other distances are possible as well. In embodiments where additional conductive rings are formed on the board 402, distances between adjacent conductive rings may similarly vary among embodiments. Further, the distances among adjacent rings may be consistent with one another or may vary.

The first coil 406 may be formed of a magnetic core (e.g., ferrite) wound with conductive windings that are electrically isolated from one another. In some embodiments, the conductive windings may be formed of a magnetic wire formed from a conductive wire (e.g., copper or aluminum) coated with a thin insulating layer (e.g., polymer or fiberglass). The first coil 406 may be formed of other materials as well.

The vehicle electrical coupling 400 may include and/or may be electrically coupled to one or more of a power supply, a vehicle transmitter (e.g., Ethernet transmitter), and a vehicle receiver (e.g., an Ethernet receiver). In embodiments where the vehicle electrical coupling 400 is electrically coupled to one or more of a power supply, a vehicle transmitter, and a vehicle receiver, the power supply, vehicle transmitter, and/or vehicle receiver may be located at the vehicle.

Figure 5:
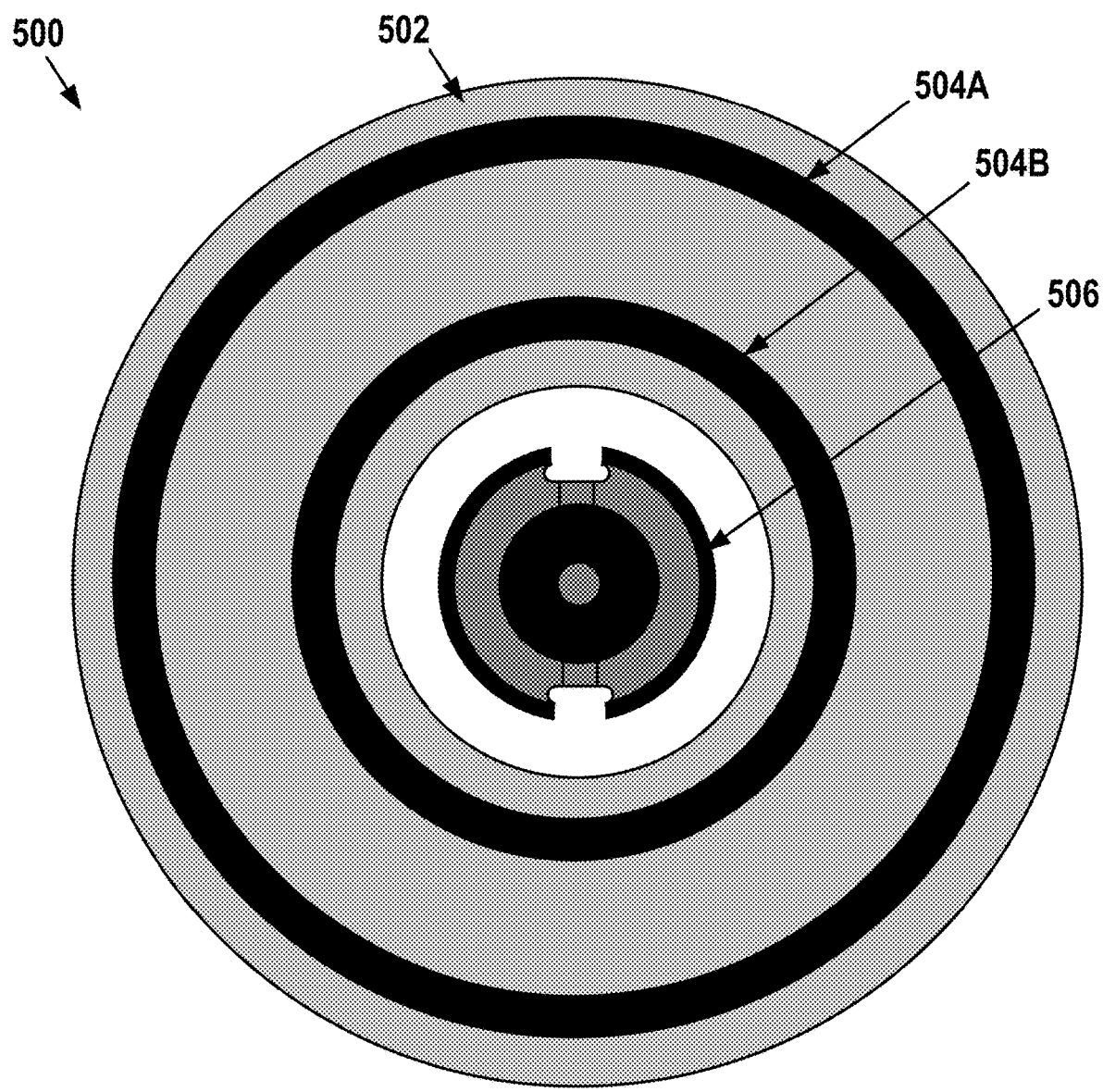
FIG. 5 illustrates an example LIDAR electrical coupling.

FIG. 5 illustrates an example LIDAR electrical coupling. As shown, the LIDAR electrical coupling 500 includes a board 502 on which a third conductive ring 504A, a fourth conductive ring 504B, and a second coil 506 are formed. As shown, the third conductive ring 504A, the fourth conductive ring 504B, and the second coil 506 are arranged concentrically. In other embodiments, the third conductive ring 504A, the fourth conductive ring 504B, and the second coil 506 may be arranged concentrically in another order (e.g., the third conductive ring 504A and the fourth conductive ring 504B may be switched) or in another arrangement, including any of those described above for the conductive rings 404A-B in connection with FIG. 4. While only two conductive rings are shown, more or fewer conductive rings are possible as well.

The board 502 may take any of the forms described above for the board 402 in connection with FIG. 4.

Similarly, the third conductive ring 504A and the fourth conductive ring 504B may take any of the forms described above for the first conductive ring 404A and the second conductive ring 404B, respectively, described above in connection with FIG. 4. While the third conductive ring 504A and the fourth conductive ring 504B may have different diameters (or lengths and widths), a surface area of the third conductive ring 504A and a surface area of the fourth conductive ring 504B may be substantially equal. For instance, in the embodiment shown, a width of the third conductive ring 504A may be narrower than a width of the fourth conductive ring 504B to compensate for the larger diameter of the third conductive ring 504A as compared to the fourth conductive ring 504B. By having substantially equal surface areas, the third conductive ring 504A and the fourth conductive ring 504B may form capacitors with the vehicle electrical coupling (as described below) that have substantially equal capacitance. A distance between the third conductive ring 504A and the fourth conductive ring 504B may vary among embodiments, but in some embodiments the distance may be between, for example, 100 μm and 250 μm. Other distances are possible as well. In embodiments where additional conductive rings are formed on the board 502, distances between adjacent conductive rings may similarly vary among embodiments. Further, the distances among adjacent rings may be consistent with one another or may vary.

The second coil 506 may take any of the forms described above for the first coil 406 in connection with FIG. 4.

The LIDAR electrical coupling 500 may include and/or may be electrically coupled to one or more of a rotatable LIDAR, a LIDAR transmitter (e.g., Ethernet transmitter), and a LIDAR receiver (e.g., an Ethernet receiver).

Figure 6B:
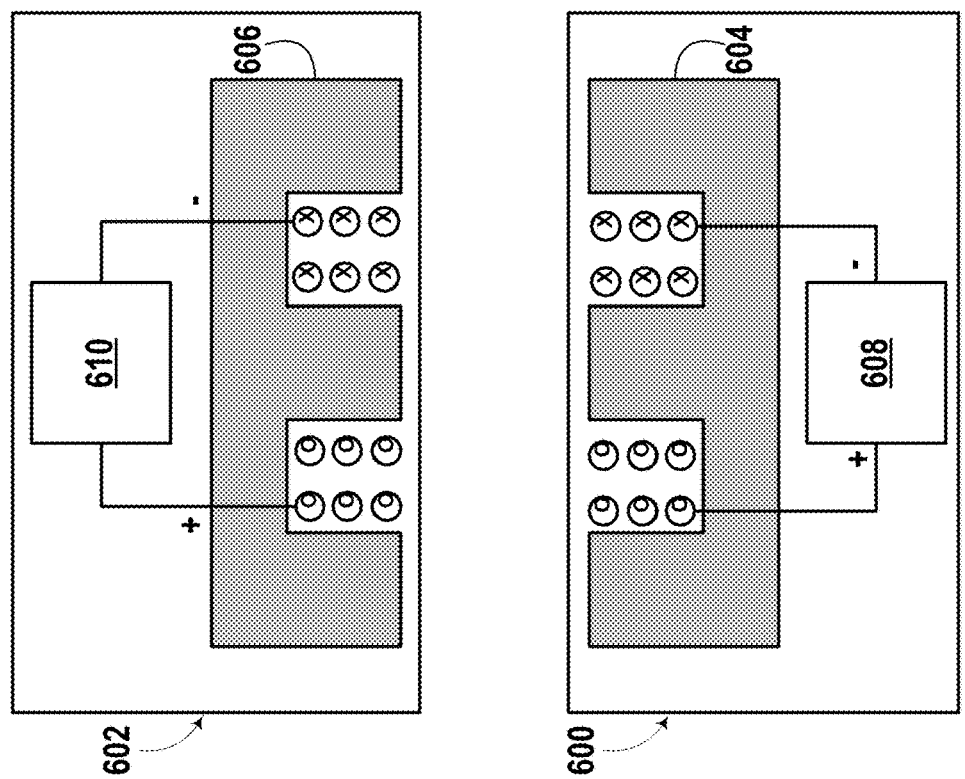
FIGS. 6A-B illustrate a transformer formed between a first coil at a vehicle electrical coupling and a second coil at a LIDAR electrical coupling in an example rotatable LIDAR device.
Figure 6A:
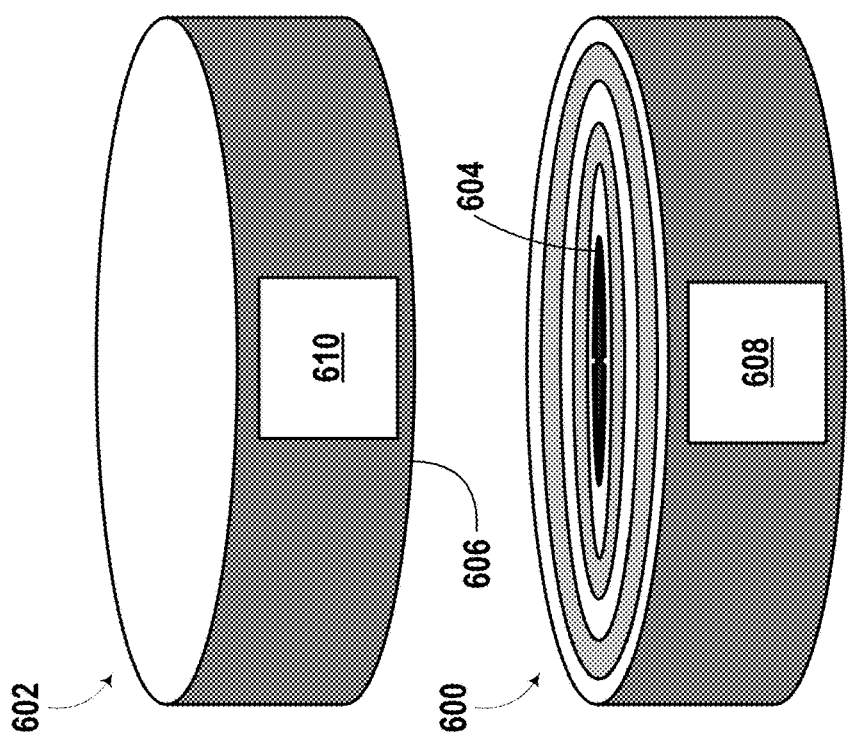

FIGS. 6A-B illustrate a transformer formed between a first coil 604 at a vehicle electrical coupling 600 and a second coil 606 at a LIDAR electrical coupling 602 in an example rotatable LIDAR device. The vehicle electrical coupling 600 may be similar to the vehicle electrical coupling 400 described above in connection with FIG. 4. In particular, the vehicle electrical coupling 600 may include a first coil 604, which may be similar to the first coil 406 described above in connection with FIG. 4. Similarly, the LIDAR electrical coupling 602 may be similar to the LIDAR electrical coupling 500 described above in connection with FIG. 5. In particular, the LIDAR electrical coupling 602 may include a second coil 606, which may be similar to the second coil 506 described above in connection with FIG. 5.

The vehicle electrical coupling 600 is further shown to include a power supply 608. The power supply 608 may be any device configured to provide power to the vehicle electrical coupling 600. While the power supply 608 is shown to be included in the vehicle electrical coupling 600, in some embodiments the power supply 608 may be located elsewhere in the vehicle and may be electrically coupled to the vehicle electrical coupling 600.

The LIDAR electrical coupling 602 is further shown to include a rotatable LIDAR 610. The rotatable LIDAR 610 may take any of the forms described above for the rotatable LIDAR 302 in connection with FIG. 3. While the rotatable LIDAR 610 is shown to be included in the LIDAR electrical coupling 602, in some embodiments the rotatable LIDAR 610 may be mounted elsewhere on the vehicle and may be electrically coupled to the LIDAR electrical coupling 602.

As shown, the vehicle electrical coupling 600 is positioned adjacent to but not in contact with the LIDAR electrical coupling 602. In particular, as shown, the first coil 604 of the vehicle electrical coupling 600 is positioned adjacent to but not in contact with the second coil 606 of the LIDAR electrical coupling 602. So positioned, the first coil 604 and the second coil 606 may form a transformer, as schematically illustrated in FIG. 6B.

As shown in FIG. 6B, the first coil 604 includes first windings around a first magnetic core, as described above. Similarly, the second coil 606 includes second windings around a second magnetic core, as described above. The power supply 608 may be electrically coupled to the first coil 604 so as to pass a varying electrical current through the first windings. As a result of the varying electrical current in the first windings, a varying magnetic flux will appear in the first magnetic core and, in turn, in the second magnetic core. The varying magnetic flux in the second magnetic core will induce a varying voltage in the second windings. As a result of the varying voltage in the second windings, the rotatable LIDAR 610 connected to the second windings will receive an output power from the second windings. In this manner, power may be provided from the power supply 608 to the rotatable LIDAR 610 via the vehicle electrical coupling 600 and the LIDAR electrical coupling 602.

While particular numbers of first windings and second windings are shown, it will be appreciated that the number of windings on each of the first coil 604 and the second coil 606 may be varied, with the result that a ratio of the voltage in the first windings to the voltage in the second windings will vary proportionately. Accordingly, the number of first windings and the number of second windings may be selected to achieve desirable power transmission characteristics.

Figure 7B:
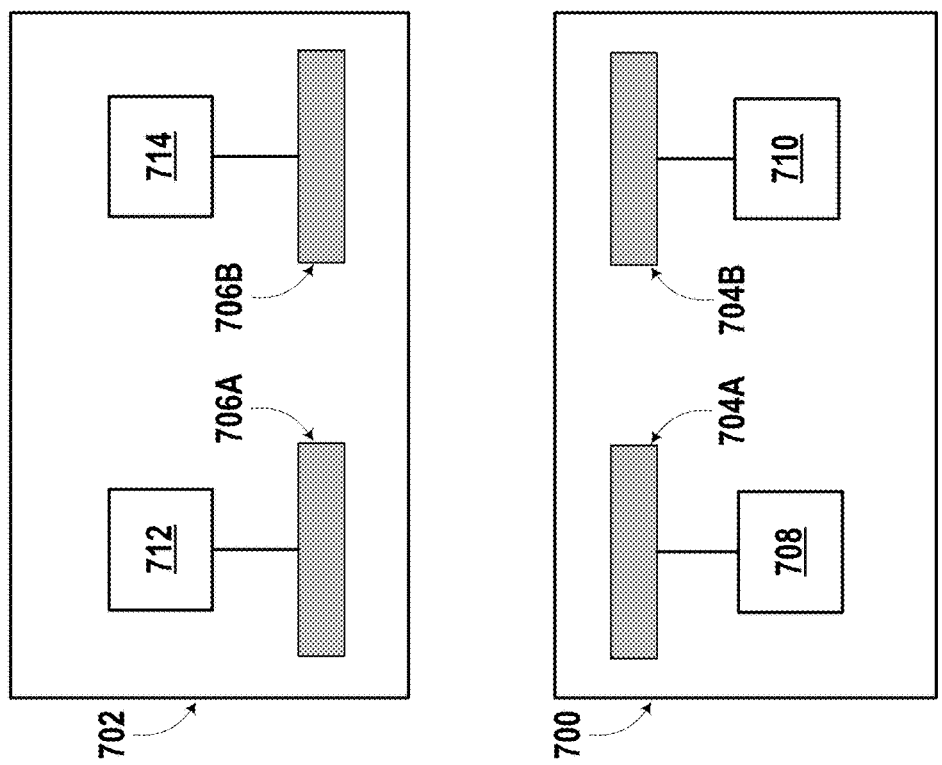
FIGS. 7A-B illustrate (i) a first capacitor formed between a first conductive ring at a vehicle electrical coupling and a third conductive ring at a LIDAR electrical coupling and (ii) a second capacitor formed between a second conductive ring at the vehicle electrical coupling and a fourth conductive ring at the LIDAR electrical coupling in an example rotatable LIDAR device.
Figure 7A:
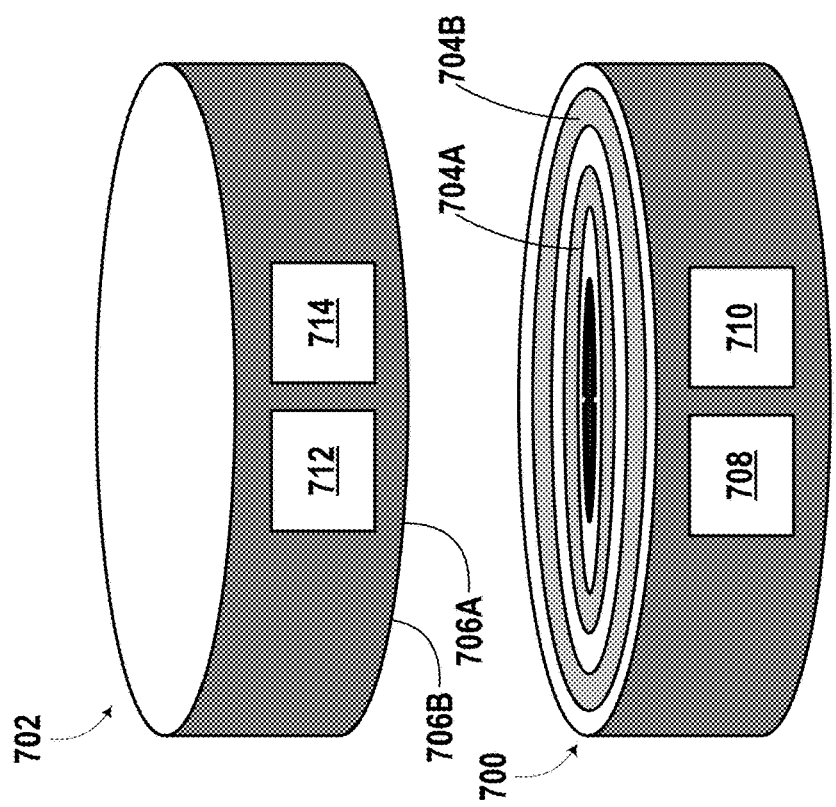

FIGS. 7A-B illustrate (i) a first capacitor formed between a first conductive ring 704A at a vehicle electrical coupling 700 and a third conductive ring 706A at a LIDAR electrical coupling 702 and (ii) a second capacitor formed between a second conductive ring 704B at the vehicle electrical coupling 700 and a fourth conductive ring 706B at the LIDAR electrical coupling 702 in an example rotatable LIDAR device.

As shown, the vehicle electrical coupling 700 includes a first conductive ring 704A and a second conductive ring 704B. Each of the first conductive ring 704A and the second conductive ring 704B may take any of the forms described above for the first conductive ring 404A and the second conductive ring 404B, respectively, described above in connection with FIG. 4. Further, the first conductive ring 704A and the second conductive ring 704B may be arranged in any of the manners described above for the first conductive ring 404A and the second conductive ring 404B, respectively, described above in connection with FIG. 4. While two conductive rings are shown, in other embodiments more or fewer conductive rings are possible.

The vehicle electrical coupling 700 may further include a vehicle transmitter (e.g., Ethernet transmitter) 708 and a vehicle receiver (e.g., Ethernet receiver) 710, as shown. The vehicle transmitter 708 may be electrically coupled to the first conductive ring 704A. The vehicle transmitter 708 may be configured to transmit communications from one or more components at the vehicle, such as a computer system. Other components are possible as well. The vehicle receiver 710 may be electrically coupled to the second conductive ring 704B. The vehicle receiver 710 may be configured to receive communications directed to one or more components at the vehicle, such as a computer system. Other components are possible as well. While the vehicle transmitter 708 and the vehicle receiver 710 are shown to be included in the vehicle electrical coupling 700, in some embodiments the vehicle transmitter 708 and/or the vehicle receiver 710 may be located separately from and electrically coupled to the vehicle electrical coupling 700.

As shown, the LIDAR electrical coupling 702 includes a third conductive ring 706A and a fourth conductive ring 706B. Each of the third conductive ring 706A and the fourth conductive ring 706B may take any of the forms described above for the third conductive ring 504A and the fourth conductive ring 504B, respectively, described above in connection with FIG. 5. Further, the third conductive ring 706A and the fourth conductive ring 706B may be arranged in any of the manners described above for the third conductive ring 504A and the fourth conductive ring 504B, respectively, described above in connection with FIG. 5. While two conductive rings are shown, in other embodiments more or fewer conductive rings are possible.

The LIDAR electrical coupling 702 may further include a LIDAR receiver (e.g., Ethernet receiver) 712 and a LIDAR transmitter (e.g., Ethernet transmitter) 714, as shown. The LIDAR receiver 712 may be electrically coupled to the third conductive ring 706A. The LIDAR receiver 712 may be configured to receive communications directed to the rotatable LIDAR. Communications directed to other components are possible as well. The LIDAR transmitter 714 may be electrically coupled to the fourth conductive ring 706B. The LIDAR transmitter 714 may be configured to transmit communications from a rotatable LIDAR (not shown). The LIDAR transmitter 714 may be configured to transmit communications from other components as well.

As shown, the vehicle electrical coupling 700 is positioned adjacent to but not in contact with the LIDAR electrical coupling 702. In particular, as shown, the first conductive ring 704A of the vehicle electrical coupling 700 is positioned adjacent to but not in contact with the third conductive ring 706A of the LIDAR electrical coupling 702. So positioned, the first conductive ring 704A and the third conductive ring 706A may form a first capacitor, as schematically illustrated in FIG. 7B.

Further, as shown, the second conductive ring 704B of the vehicle electrical coupling 700 is positioned adjacent to but not in contact with the fourth conductive ring 706B of the LIDAR electrical coupling 702. So positioned, the second conductive ring 704B and the fourth conductive ring 706B may form a second capacitor, as schematically illustrated in FIG. 7B.

As shown in FIG. 7B, the first conductive ring 704A and the third conductive ring 706A may each form a plate of the first capacitor, and air between the first conductive ring 704A and the third conductive ring 706A may form a dielectric of the first capacitor. As will be understood, a capacitance of the first capacitor will be directly proportional to a surface area of its plates, namely the first conductive ring 704A and the third conductive ring 706A. Accordingly, surface areas of the first conductive ring 704A and the third conductive ring 706A may be selected for a desirable capacitance. Further, as will be understood, the capacitance of the first capacitor will be indirectly proportional to a distance between its plates, namely the first conductive ring 704A and the third conductive ring 706A. Accordingly, in positioning the vehicle electrical coupling 700 and the LIDAR electrical coupling 702, the distance between the first conductive ring 704A and the third conductive ring 706A may be selected for a desirable capacitance.

As noted above, the first conductive ring 704A may be electrically coupled to the vehicle transmitter 708, and the third conductive ring 706A may be electrically coupled to the LIDAR receiver 712. Accordingly, the first capacitor may allow for the transmission of communications from the vehicle transmitter 708 to the LIDAR receiver 712. As noted above, the vehicle transmitter 708 may be configured to transmit communications from one or more components at the vehicle, and the LIDAR receiver 712 may be configured to receive communications directed to the rotatable LIDAR. Thus, the vehicle electrical coupling 700 and the LIDAR electrical coupling 702 may allow for transmission of communications from the vehicle to the rotatable LIDAR via the first capacitor.

As shown in FIG. 7B, the second conductive ring 704B and the fourth conductive ring 706B may each form a plate of the second capacitor, and air between the second conductive ring 704B and the fourth conductive ring 706B may form a dielectric of the second capacitor. As will be understood, a capacitance of the second capacitor will be directly proportional to a surface area of its plates, namely the second conductive ring 704B and the fourth conductive ring 706B. Accordingly, surface areas of the second conductive ring 704B and the fourth conductive ring 706B may be selected for a desirable capacitance. Further, as will be understood, the capacitance of the second capacitor will be indirectly proportional to a distance between its plates, namely the second conductive ring 704B and the fourth conductive ring 706B. Accordingly, in positioning the vehicle electrical coupling 700 and the LIDAR electrical coupling 702, the distance between the second conductive ring 704B and the fourth conductive ring 706B may be selected for a desirable capacitance.

As noted above, the fourth conductive ring 706B may be electrically coupled to the LIDAR transmitter 714, and the second conductive ring 704B may be electrically coupled to the vehicle receiver 710. Accordingly, the second capacitor may allow for the transmission of communications from the LIDAR transmitter 714 to the vehicle receiver 710. As noted above, the LIDAR transmitter 714 may be configured to transmit communications from the rotatable LIDAR, and the vehicle transmitter 710 may be configured to receive communications directed to one or more components at the vehicle. In this manner, the LIDAR electrical coupling 702 and the vehicle electrical coupling 700 may allow for transmission of communications from the rotatable LIDAR to the vehicle via the second capacitor.

In some embodiments, each of the vehicle transmitter 708 and the LIDAR transmitter 714 may be an Ethernet transmitter, and each of the vehicle receiver 710 and the LIDAR receiver 712 may be an Ethernet receiver. In these embodiments, an Ethernet link may be established between the rotatable LIDAR and the vehicle via the first and second capacitors. The Ethernet link may be, for example, a 100 MB Ethernet link. Other Ethernet links are possible as well.

Figure 8:
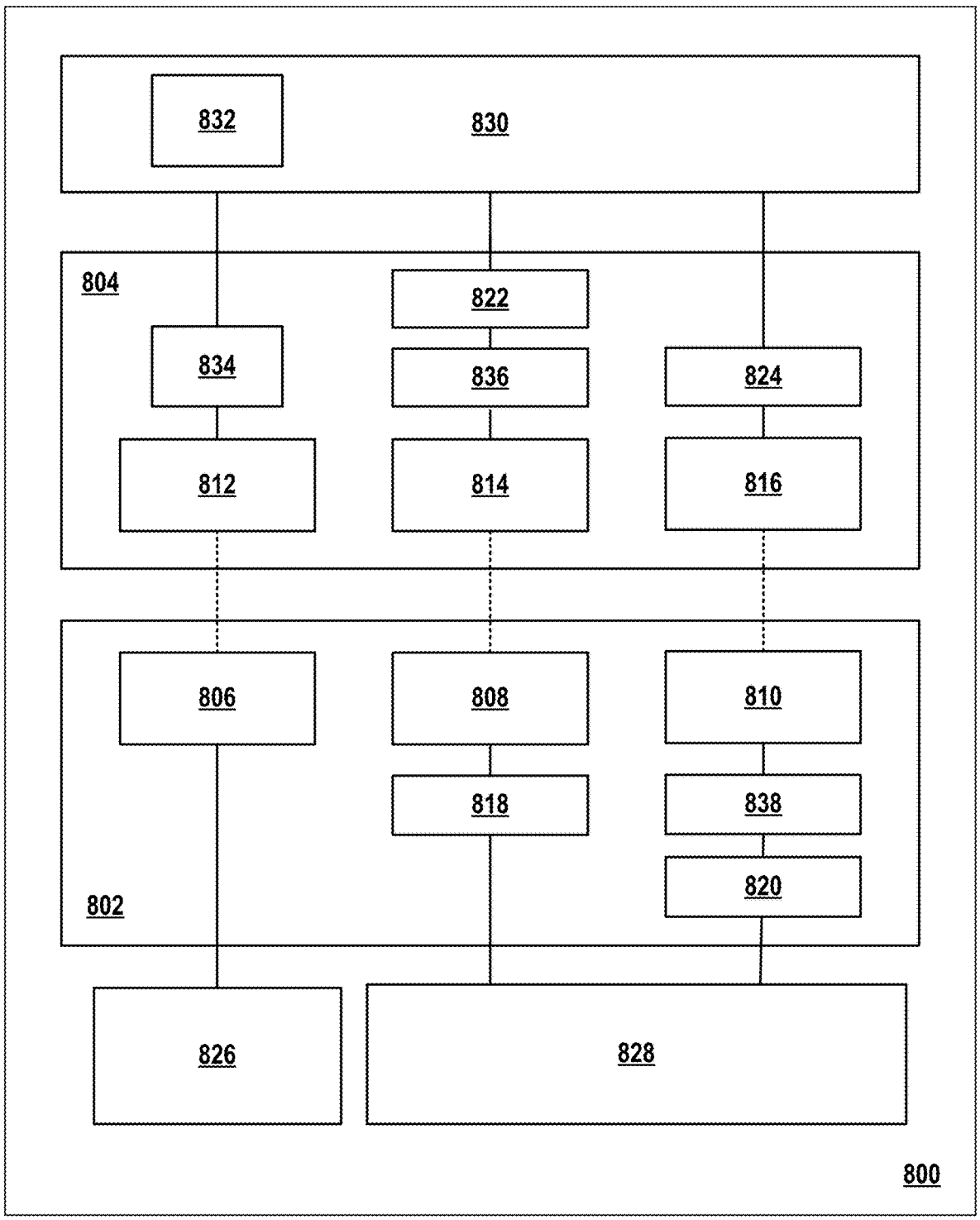
FIG. 8 schematically illustrates a LIDAR device

FIG. 8 schematically illustrates a LIDAR device 800. The LIDAR device 800 may, for example, be implemented in a vehicle, such as an autonomous vehicle.

As shown, the LIDAR device 800 includes a vehicle electrical coupling 802 and a LIDAR electrical coupling 804. The vehicle electrical coupling 802 may, for example, be similar to the vehicle electrical coupling 400 described above in connection with FIG. 4. Similarly, the LIDAR electrical coupling 804 may, for example, be similar to the LIDAR electrical coupling 500 described above in connection with FIG. 5.

As shown, the vehicle electrical coupling 802 includes a first coil 806, a first conductive ring 808, and a second conductive ring 810. The first coil 806, the first conductive ring 808, and the second conductive ring 810 may, for example, be similar to the first coil 406, the first conductive ring 404A, and the second conductive ring 404B, respectively, described above in connection with FIG. 4. The vehicle electrical coupling 802 further includes a vehicle transmitter (e.g., Ethernet transmitter) 818 and a vehicle receiver (e.g., Ethernet receiver) 820. The vehicle transmitter 818 and the vehicle receiver 820 may, for example, be similar to the vehicle transmitter 708 and the vehicle receiver 710 described above in connection with FIGS. 7A-B.

As shown, the LIDAR electrical coupling 804 includes a second coil 812, a third conductive ring 814, and a fourth conductive ring 816. The second coil 812, the third conductive ring 814, and the third conductive ring 816 may, for example, be similar to the second coil 506, the third conductive ring 504A, and the fourth conductive ring 504B, respectively, described above in connection with FIG. 5. The LIDAR electrical coupling 804 further includes a LIDAR receiver (e.g., Ethernet receiver) 822 and a LIDAR transmitter (e.g., Ethernet transmitter) 824. The LIDAR receiver 822 and the LIDAR transmitter 824 may, for example, be similar to the LIDAR receiver 712 and the LIDAR transmitter 714 described above in connection with FIGS. 7A-B.

The first coil 806 may be electrically coupled to a power supply 826, as shown. The power supply 826 may, for example, be similar to the power supply 608 described above in connection with FIGS. 6A-B. As shown, the power supply 826 is located separately from the vehicle electrical coupling 802. For example, in embodiments where the rotatable LIDAR device 800 is implemented with a vehicle, the power supply 826 may be located elsewhere in the vehicle and electrically coupled to the vehicle electrical coupling 802. In other embodiments, the power supply 826 may be included in the vehicle electrical coupling 802.

The vehicle transmitter 818 may be electrically coupled to one or more components 828 of the vehicle, as shown. The component(s) 828 may include, for example, a computer system. Other components are possible as well. The vehicle transmitter 818 may be configured to transmit communications from the component(s) 828. The vehicle receiver 820 may also be electrically coupled to the component(s) 828, as shown. The vehicle receiver 820 may be configured to receive communications directed to the component(s) 828.

The second coil 812 may be electrically coupled to a rotatable LIDAR 830, as shown. The rotatable LIDAR 830 may, for example, be similar to the rotatable LIDAR 302 described above in connection with FIG. 3. As shown, the rotatable LIDAR 830 may include a motor 832 configured to rotate the rotatable LIDAR 830. While the LIDAR receiver 822 and the LIDAR transmitter 824 are each shown to be included in the LIDAR electrical coupling 804, in some embodiments one or both of the LIDAR receiver 822 and the LIDAR transmitter 824 may be located in the rotatable LIDAR 830 and may be electrically coupled to the LIDAR electrical coupling 804.

In operation, the power supply 826 may provide power to the rotatable LIDAR 830 via a transformer formed from the first coil 806 and the second coil 812, as described above in connection with FIGS. 6A-B. As noted above, the transformer formed from the first coil 806 and the second coil 806 may enable a varying voltage to be induced in the second coil 806. Because the induced voltage in the second coil 812 is varying, in some embodiments a rectifier 834 may be included between the second coil 812 and the rotatable LIDAR 830. The rectifier 834 may serve to convert the varying voltage to a direct (non-varying) voltage to be provided to the rotatable LIDAR 830. In this manner, power from the power supply 826 may be provided to the rotatable LIDAR 830 via the vehicle electrical coupling 802 and the LIDAR electrical coupling 804.

Further, in operation, the vehicle transmitter 818 may receive from the component(s) 828 communications directed to the rotatable LIDAR 830. The vehicle transmitter 818 may transmit the communications to the LIDAR receiver 822 via a first capacitor formed from the first conductive ring 808 and the third conductive ring 814, as described above in connection with FIGS. 7A-B. Because air is a poor dielectric, the capacitance of the first capacitor while the communications are being transmitted from the first conductive ring 808 to the third conductive ring 814 may be small (e.g., on the order of 30 pF), resulting in high impedance signals. Accordingly, a receiver circuit 836 may be included between the third conductive ring 814 and the LIDAR receiver 822. An example receiver circuit is described below in connection with FIG. 9. The receiver circuit 836 may be configured to convert the high impedance signals to low impedance signals and amplify them before providing them to the LIDAR receiver 822. The LIDAR receiver 822 may be configured to provide the communications to the rotatable LIDAR 830. In this manner, communications from the component(s) 828 may be transmitted to the rotatable LIDAR 830 via the vehicle electrical coupling 802 and the LIDAR electrical coupling 804.

Similarly, in operation, the LIDAR transmitter 824 may receive from the rotatable LIDAR 830 communications directed to the component(s) 828. The LIDAR transmitter 824 may transmit the communications to the vehicle receiver 820 via a second capacitor formed from the fourth conductive ring 816 and the second conductive ring 810, as described above in connection with FIGS. 7A-B. As with the first capacitor, because air is a poor dielectric, the capacitance of the second capacitor while the communications are being transmitted from the fourth conductive ring 816 to the second conductive ring 810 may be small (e.g., on the order of 30 pF), resulting in high impedance signals. Accordingly, another receiver circuit 838 may be included between the second conductive ring 810 and the vehicle receiver 820. The receiver circuit 838 may be configured to convert the high impedance signals to low impedance signals and amplify them before providing them to the vehicle receiver 820. The vehicle receiver 820 may be configured to provide the communications to the component(s) 828. In this manner, communications from the rotatable LIDAR 830 may be transmitted to the component(s) 828 via the vehicle electrical coupling 802 and the LIDAR electrical coupling 804.

While the embodiments described above included two conductive rings at the vehicle electrical coupling and two conductive rings at the LIDAR electrical coupling, it will be understood that more or fewer conductive rings are possible. For example, in embodiments where a higher capacity transmission between the vehicle electrical coupling and the LIDAR electrical coupling (and vice versa) is desired, the vehicle electrical coupling may include four conductive rings, two of which are electrically coupled to vehicle transmitters and two of which are electrically coupled to vehicle receivers (e.g., via receiver circuits, as described above). The two vehicle transmitters may be configured to transmit communications from the same component(s) or from different component(s) (e.g., of a vehicle). Similarly, the LIDAR electrical coupling may include four conductive rings, two of which are electrically coupled to LIDAR receivers (e.g., via receiver circuits, as described above) and two of which are electrically coupled to LIDAR transmitters. The two LIDAR transmitters may be configured to transmit communications from the same component(s) or from different component(s) of a rotatable LIDAR. The two vehicle receivers may be configured to receive the communications from the two LIDAR transmitters and provide the communications to the component(s). Similarly, the two LIDAR receivers may be configured to receive the communications from the two vehicle transmitters and provide the communications to the rotatable LIDAR. The transmitters and receivers at the vehicle and LIDAR electrical couplings may, for example, be Ethernet transmitters and receivers, respectively. In general, each conductive ring at a vehicle electrical coupling may be electrically coupled to one of a transmitter and a receiver, and may form a capacitor with a conductive ring at a LIDAR electrical coupling that is electrically coupled to the other of a transmitter and a receiver.

Figure 9:
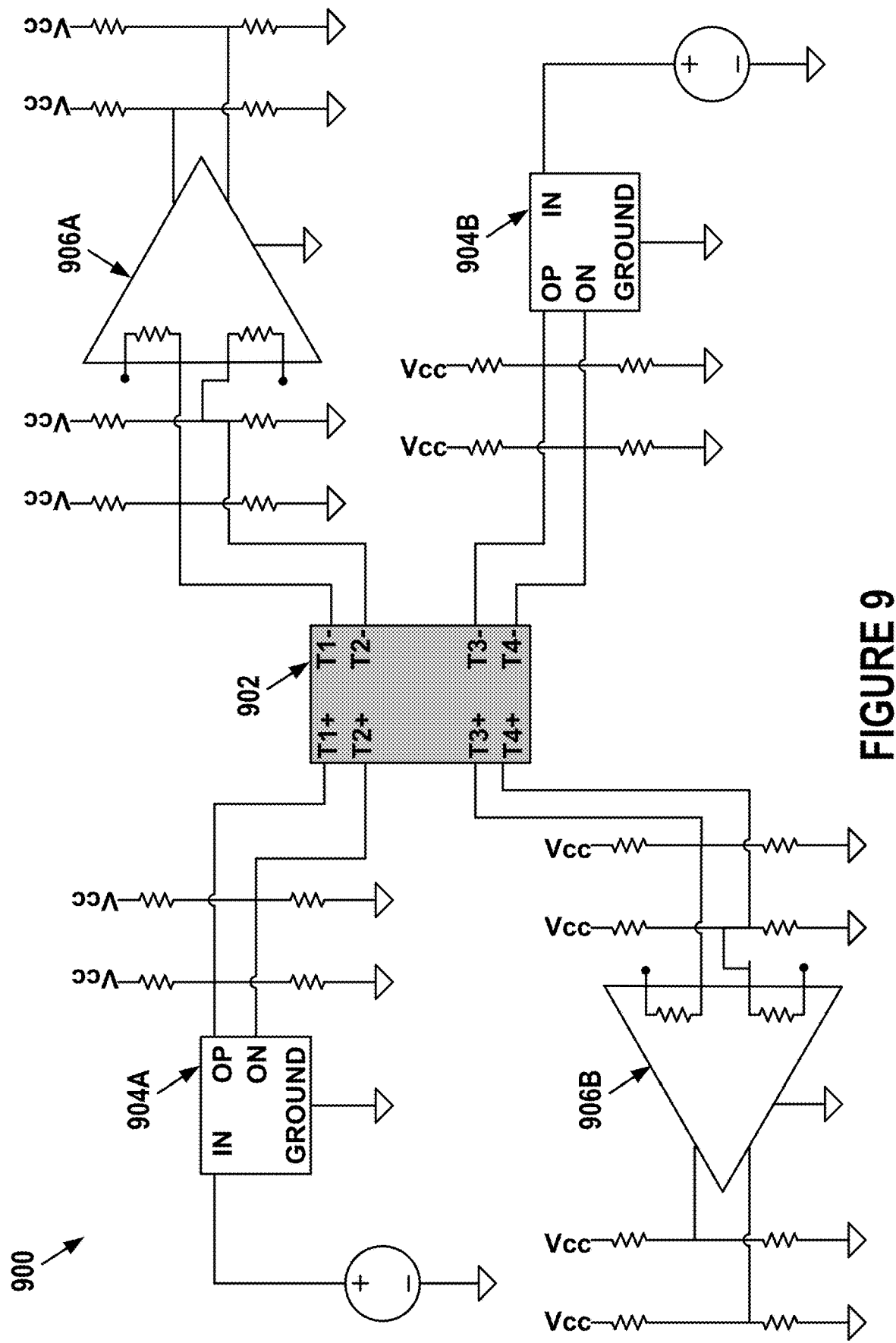
FIG. 9 is a schematic of an example receiver circuit.

FIG. 9 is a schematic of an example receiver circuit 900. The receiver circuit 900 may, for example, serve as the receiver circuit 836 described above in connection with FIG. 8. In general, the receiver circuit 900 may be used in a LIDAR receiver that includes a vehicle electrical coupling and a LIDAR electrical coupling.

To this end, the receiver circuit 900 may be configured to electrically coupled to conductive rings 902. As shown, the vehicle electrical coupling includes four conductive rings (T1+, T2+, T3+, and t4+) and the LIDAR electrical coupling includes four conductive rings (T1−, T2−, T3−, and T4−). Each of the conductive rings may take any of the forms described above for the conductive rings 404A-B and/or 504A-B in connection with FIGS. 4 and 5, respectively.

Two of the conductive rings at the vehicle electrical coupling (T1+, T2+) may be configured to transmit communications to the LIDAR electrical coupling, and two of the conductive rings at the LIDAR electrical coupling (T1−, T2−) may be configured to receive the communications. In particular, the conductive rings T1+ and T2+ may form a transmit pair, and the conductive rings T1−, T2− may form a receive pair. The communications may be transmitted differentially, such that the LIDAR electrical coupling detects a difference between the conductive rings T1−, T2−. Such differential transmission may improve resistance of the communications to electromagnetic noise.

Similarly, the remaining two conductive rings at the LIDAR electrical coupling (T3−, T4−) may be configured to transmit communications to the vehicle electrical coupling, and the remaining two conductive rings at the vehicle electrical coupling (T3+, T4+) may be configured to receive the communications. In particular, the conductive rings T3−, T4− may form a transmit pair, and the conductive rings T3+, T4+ may form a receive pair. The communications may be transmitted differentially, such that the vehicle electrical coupling detects a difference between the conductive rings T3+, T4+. Such differential transmission may similarly improve resistance of the communications to electromagnetic noise.

As shown, conductive rings T1+ and T2+ are electrically coupled to a driver 904A. Similarly, as shown, conductive rings T3− and T4− are electrically coupled to a driver 904B. The drivers 904A-B may be configured to control the conductive rings T1+, T2+ and T3−, T4−, respectively. It will be understood that the drivers 904A-B may take any number of forms besides that shown.

Further, as shown, conductive rings T1− and T2− are electrically coupled to a comparator 906A, and conductive rings T3+ and T4+ are electrically coupled to a comparator 906B. The comparators 906A-B may be configured to convert analog signals received from the conductive rings T1−, T2− and T3+, T4+, respectively, into digital signals. It will be understood that the comparators 906A-B may take any number of forms besides that shown.

While the receiver circuit 900 is shown to include particular elements arranged in a particular manner, it will be understood that more, fewer, and/or different elements arranged in the same or another manner are possible as well. In general, the receiver circuit 900 may be any circuit configured to translate communications between the conductive rings and the vehicle or LIDAR electrical coupling.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

What is claimed is:

1. An apparatus comprising:
    a first electrical coupling comprising a first coil, a first conductor disposed around the first coil, and a first printed circuit board on which the first conductor is disposed;
    a second electrical coupling comprising a second coil, a second conductor disposed around the second coil, and a second printed circuit board on which the second conductor is disposed, wherein the second electrical coupling is configured to rotate relative to the first electrical coupling, and wherein the second electrical coupling is positioned relative to the first electrical coupling such that the second coil is spaced apart from the first coil and the second conductor is spaced apart from the first conductor; and
    a device electrically coupled to the second electrical coupling, wherein the first coil and the second coil form a transformer configured to provide power to the device, and wherein the first conductor and the second conductor form a communication link configured to transmit communications from the device.

2. The apparatus of claim 1, wherein the device comprises a light detection and ranging (LIDAR) device.

3. The apparatus of claim 1, wherein the first electrical coupling is configured to be mounted on a vehicle.

4. The apparatus of claim 1, wherein the first coil and first conductor are arranged concentrically.

5. The apparatus of claim 1, wherein the second coil and second conductor are arranged concentrically.

6. The apparatus of claim 1, wherein the first conductor is ring shaped and the second conductor is ring shaped.

7. The apparatus of claim 1, wherein the second electrical coupling is positioned relative to the first electrical coupling such that the second coil is adjacent to the first coil but at a distance from the first coil.

8. The apparatus of claim 1, wherein the distance is between 100 µm and 250 µm.

9. The apparatus of claim 1, wherein the first coil and the first conductor are disposed in different planes, and wherein the second coil and the second conductor are disposed in different planes.

* * * * *